April 1, 1969    H. SCHMITT    3,436,158
EXPOSURE METER USING TWO INDICATOR LAMPS
Filed Feb. 23, 1968                      Sheet 2 of 2

INVENTOR
HELMUT SCHMITT
BY Nolte & Nolte
ATTORNEYS

United States Patent Office 3,436,158
Patented Apr. 1, 1969

3,436,158
EXPOSURE METER USING TWO
INDICATOR LAMPS
Helmut Schmitt, Hausen, Germany, assignor to P. Gossen
& Co. G.m.b.H., Erlangen, Bavaria, Germany
Filed Feb. 23, 1968, Ser. No. 707,792
Claims priority, application Germany, Feb. 25, 1967,
G 49,412
Int. Cl. G01j 1/44
U.S. Cl. 356—226          9 Claims

ABSTRACT OF THE DISCLOSURE

The voltage drop of a photoresistor circuit is fed to the input of a two-stage transistor amplifier in the collector output circuits of which two indicator lamps are disposed. The state of these lamps is observed which indicate proper adjustment at equal brightness or need for additional adjustment in one direction depending on the brightness or darkness of one of the lamps. In front of the photoresistor a light attenuator is disposed, the instantaneous position of which represents the light intensity falling on the photoresistor. The attenuator which may be in the form of a stop or diaphragm is coupled with the setting or computing parts of a camera or with a computing ring in the case of an exposure meter.

BACKGROUND OF THE INVENTION

Field of the invention

The present invention relates to an exposure meter or exposure control device in which the measured value is obtained through the visual observation of two light elements.

Prior art

In a known exposure meter a transistorized chopper chops up the voltage of a battery which is then subsequently stepped up to about 50 volts. The voltage obtained is then rectified, filtered, and fed to the anodes of two gaseous triodes the grids of which are supplied with a variable potential. Such variable potential is taken off from a variable resistor which is placed into the diagonal of a bridge. The bridge includes in one of its outer branches a photoresistor, while in another branch thereof there is a variable resistor which can be adjusted in accordance with the different conditions characterizing the picture taking. The gaseous tubes are adjusted to equal brightness through the variation of the grid voltages. The adjustment of the grid potentiometer in the bridge diagonal is then representative of the illumination falling on the photoresistor.

It is obvious that such a device requires excess space and its weight is such that the practical use of the device is extremely restricted.

Summary of the invention

It is, therefore, an object of the present invention to provide an improved exposure meter or exposure control device employing simple and robust structural elements which possess high measuring sensitivity and indicating accuracy, while the size of the device is kept at a minimum.

In accordance with the invention, the voltage drop on a resistor lying in circuit relationship with a photoresistor is fed to a two stage transistorized amplifier in the collector circuits of which a pair of indicating light bulbs are placed, the instantaneous light state of which are observed. In front of the light entry aperture to the photoresistor a variable light attenuating element, such as a diaphragm or stop is placed, the instantaneous position of which represents the intensity of the illumination falling on the photoresistor. This stop is coupled with the adjusting or computing means of a camera, or in case of a light exposure meter, it is coupled with a computing or graduated ring.

Brief description of the drawings

FIG. 3b is a diagram showing the light intensity relations obtained with the arrangement of FIG. 3a;

FIG. 4a is a different embodiment similar to FIG. 3a;

FIG. 4b is a curve similar to FIG. 3b but relating to the arrangement of FIG. 4a;

FIG. 5 is a masking closure to be used with the arrangement of FIGS. 3a and 4a;

Description of the preferred embodiments

Figure 1:
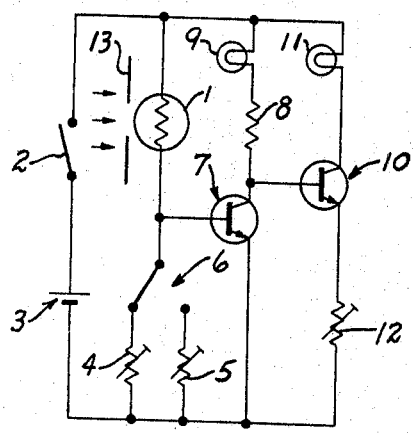
FIG. 1 is a circuit diagram of an exposure meter in accordance with the invention.

Referring to FIG. 1, a photoresistor 1 is connected to a battery 3 through a switch and through one of a pair of selectively connectable ohmic resistors 4 and 5. The resistors 4 and 5 are thrown selectively into the circuit of the photoresistor by a range switch 6. The base of a transistor 7 is connected between the photoresistor 1 and the range switch 6, while the emitter of transistor 7 is returned to the negative terminal of the battery. The collector of transistor 7 is returned to the positive terminal of battery 3 through a limiting resistor 8 and a small lamp 9 serving as one of the indicator lights. Transistor 7 controls a further transistor 10 in the collector circuit of which a second lamp 11 is placed. The emitter circuit of transistor 10 contains a trimmer resistor 12. In front of the photoresistor 1 a light attenuating means 13 is disposed.

Figure 2:
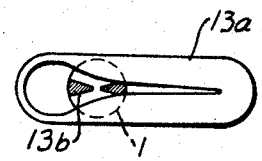
FIG. 2 is a schematic illustrating a preferred embodiment of the diaphragm or stop construction.

One of the preferred embodiments of such light attenuating means is shown in FIG. 2. It consists from a known crescent or beak diaphragm 13a and from a fixed cover 13b placed in front of the photoresistor 1. This arrangement permits an operation on a relatively small number of measuring ranges for example on 7 ranges. By additionally employing a grey wedge filter in combination with the crescent or beak shaped diaphragm, a greater number of measuring ranges may be attained. The filter is placed into the aperture of the stop 13a in such a manner that when the aperture of the diaphragm stop decreases, the light sealing property of the apparatus increases. By using the selectively switchable resistors 4 and 5, about 30 measuring ranges can be attained.

The above-described arrangement operates as follows:

The illuminated photoresistor 1 together with the range calibrating resistors 4 or 5 forms a voltage divider circuit. Depending on the light intensity falling on the photoresistor, the base-emitter voltage of transmitter 7 also changes whereupon the latter becomes more or less conductive according to the changing light intensity, while transistor 10, becomes more or less conductive in the opposite sense to transistor 7. Now, when at a certain light intensity falling on the photoresistor 1 transistor 7 will conduct, lamp 9 will glow bright due to the high collector current, while lamp 11 remains turned off. By adjusting the diaphragm or stop 13 in such a manner that less light will fall on the photoresistor, base-emitter voltage and accordingly the collector current of transistor 7 becomes smaller and lamp 9 starts to glow less brightly and will be extinguished with further decreasing collector current, while at the same time transistor 10 becomes more heavily conductive. Consequently, the other lamp 11 becomes turned on and after further rotation of the stop 13, the lamp 11 will glow brighter and brighter. If at a certain diaphragm position both lamps will glow with equal brightness, then the desired exposure setting has been attained and one may set the adjusting or computing scales coupled with the stop 13 to the exposure value or to read off the time-stop combination values.

Figure 3B:
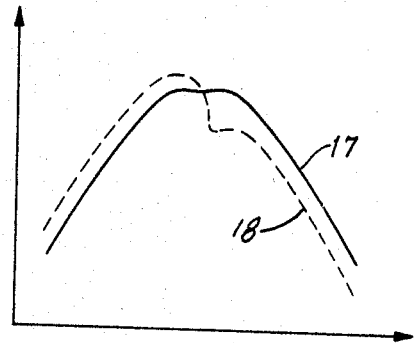
Figure 4B:
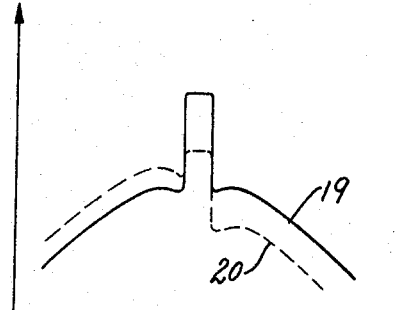
Figure 5:
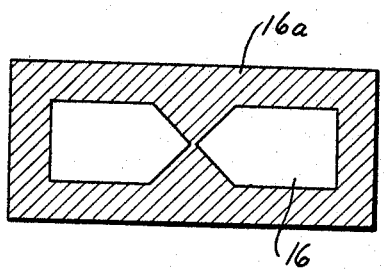

Since the light intensities with which the lamps glow are subjectively evaluated, this cannot lead to very accurate measurements. Therefore, the invention provides an indicating arrangement as shown in FIGS. 3–5 in which by the employment of simple structural features high accuracy in the measurement and adjustment can be attained.

Figure 3A:
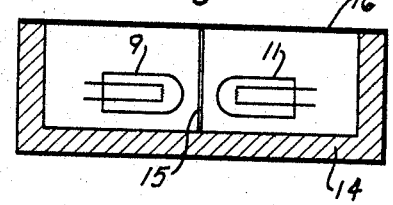
FIG. 3a is a sectional side view of the indicating light elements in their operational position.

In accordance with the invention, both lamps 9 and 11 as seen in FIG. 3a are placed closely adjacent and in a housing 14 which is separated by a non-translucent wall portion 15. The opening of the housing is covered by a translucent dispersing disc 16 under which the lamps 9 and 11 are disposed in close proximity. The disc 16 shows a noticeable drop of the light intensity toward its outer edges. This structural arrangement permits the attainment of a brightness maximum appearing in the middle of dispersing disc 16 when both lamps glow with equal brightness, while such brightness maximum will be displaced toward the left or to the right depending whether one or the other of the lamps glows less brightly.

The above arrangement still does not give the most favorable comparison, since during the measuring process it is set to produce the maximum brightness composed from the maxima or both lamps in the middle of the dispersing disc.

FIG. 3b shows the brightness distribution attained with the arrangement of FIG. 3a. Curve 17 shows the brightness distribution when the actual value is attained under which conditions both lamps glow with equal brightness. Both maxima lie so closely together that the slight drop (in the form of the saddle) in the middle becomes practically negligible. The dashed curve 18 shows the brightness distribution under mistuned conditions when lamp 11 glows less bright. But this is the case when the mistuning remains within permissible limits. At a larger mistuning, however, one of the lamps extinguishes completely while the other lamp will glow. Under the conditions corresponding to curve 18, the viewer sees a displacement of the maximum brightness from the middle toward one side which then enables the viewer to adjust the light attenuator 13 into the required direction in order to attain the proper measuring value.

Figure 4A:
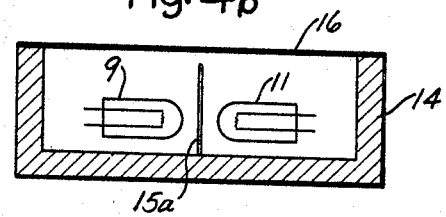

Another embodiment of the indicating arrangement is shown in FIG. 4a. In this case, the separating wall 15a does not provide a complete separation all the way up to the disc 16. By this arrangement a somewhat different brightness distribution can be attained as seen from curves 19 and 20 of FIG. 4b which are symmetrically placed above the structural showing of FIG. 4a. When the desired measuring value is attained, in the middle of the disc, an elevated maximum will appear which is then flanked on both sides by two equally glowing secondary maximae.

A further improvement of the indicating arrangement is shown in FIG. 5 in which a masking disc 16a is placed on the top of dispersing disc 16 covering parts of the dispersing disc. This masking disc includes two oppositely pointed arrow-like or similarly shaped patterns cut out from the masking disc. Should the light spot fall near the points of the arrows on both sides, then the proper adjustment has been attained.

Figure 6:
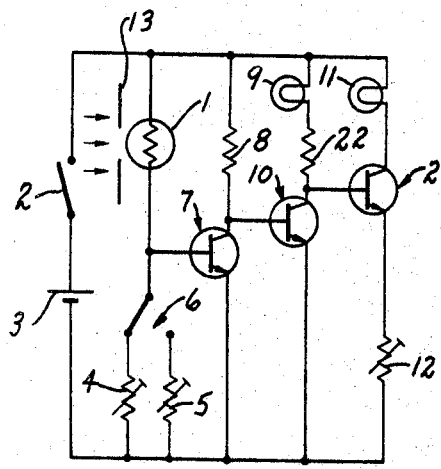
FIG. 6 is another embodiment of the invention similar to FIG. 1 but using a preamplifier stage.

A further embodiment of the circuit arrangement is shown in FIG. 6. This circuit includes the basic circuits of FIG. 1 and an additional amplifying stage comprising a transistor 21 and a resistor 22. Transistor 21 serves as a preamplifier in order to provide a higher measuring sensitivity for the device since otherwise the amplification factors of transistors 7 and 10 and the combined effect of the resistor value of photoresistor 1 provides only a relatively low initial sensitivity. The operation of this further embodiment is similar to FIG. 1 in its remaining aspects.

Figure 7:
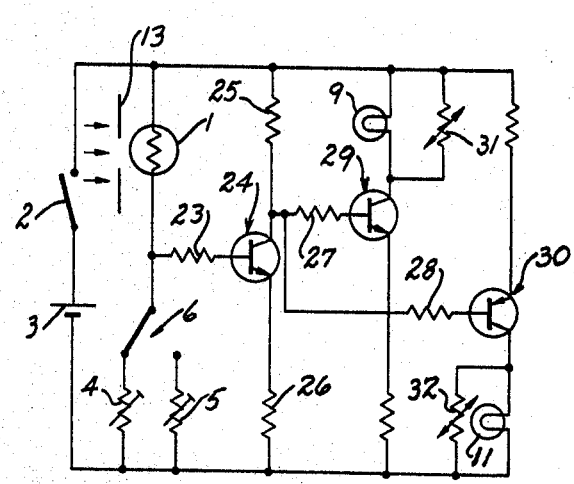
FIG. 7 is a further embodiment of the circuit aspect of the invention.

A still further embodiment of the circuit aspect of the invention is shown in FIG. 7. It includes again switch 2, battery 3 and photoresistor 1 which in combination with the calibrating resistors 4 or 5 forms a voltage divider. This voltage divider circuit is connected over a resistor 23 to a transistor 24 which having resistor 25 in tis collector and resistor 26 in its emitter circuit forms a preamplifier stage. The collector circuit of transistor 24 is connected through a resistor 27 to the base of transistor 29 and through a resistor 28 to the base of transistor 30. The conductivity of transistor 30 is opposite to that of transistor 29. The collector circuits of transistors 29 and 30 contain the indicator lamps 9 and 11. Both lamps are shunted by a voltage dependent resistor such as 31 and 32, respectively, which serve as voltage limiters for the indicator lamps. In this manner in the zeroed or adjusted condition both lamps will glow approximately with the same brightness like one of the lamps glows above or below the desired value. This is advantageous since the adjusted condition can be easily ascertained even when the dispersing disc 16 is exposed to high illumination from the outside.

Figure 8:
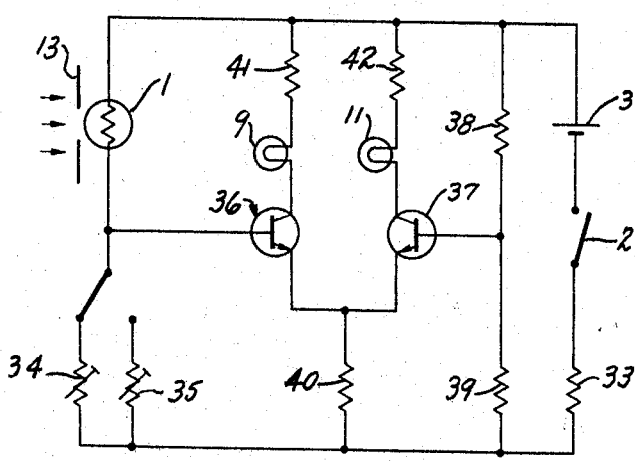
FIG. 8 is a still further embodiment of the invention employing a differential amplifier.

In a further embodiment of the invention, shown in FIG. 8, a differential amplifier is used in order to compensate for measuring errors due to temperature changes or changes in the voltage suply of the battery. This circuit includes again photoresistor 1 and calibrating resistors 34 and 35 forming a voltage divider therewith which is connected through switch 2 and resistor 33 to battery 3. The voltage divider is connected to the base of transistor 36 while the base of transistor 37 is connected to a further voltage divider consisting of resistors 38 and 39. The emitters of transistors 36 and 37 are interconnected and through a resistor 40 are returned to the negative terminal of the battery. The collector circuits of transistors contain again lamps 9 and 11 including a limiting resistor 41 and 42 for each.

The above-described circuit arrangement operates as follows:

Should the resistance value of the photoresistor 1 change, then the conductivity of transistors 36 will change in an opposite sense to the conductivity of transistor 37. Under this condition one of the lamps will glow brighter, the other less bright. The zeroed condition is present again when the lamps glow with equal brightness. The indicating arrangement will be similar to those described in connection with the circuits of FIGS. 1, 6 and 7.

In case an exposure regulator or controlling device is used with the above-described embodiments, then the light attenuator 13 is coupled with the setting means of a camera.

While there has been described at present what are considered to be preferred embodiments of the present invention, many modifications and variations may occur to those skilled in the art. Therefore, it is intended that the appended claims shall cover all such modifications and variations as fall within the true spirit and scope of the invention.

What is claimed is:

1. A photoelectric exposure control device comprising a source of electric potential, photoresistor means coupled to said source of electric potential, ohmic resistor means coupled to said photo resistor means and said source of potential to form a voltage divider, a first semiconductor amplifier means coupled to said voltage divider between said photoresistor means and said resistor means and having a first indicator means operatively connected to its output circuit to be actuated in dependency on the intensity of light illuminating said photoresistor, a second semiconductor amplifier means coupled to said first amplifier means and having a second indicator means coupled to its output circuit to be actuated in the inverse relation to the indication of said first indicator means, and a variable light attenuator means disposed in front of said photoresistor means for setting equal indication on said first and second indicator means.

2. The photoelectric exposure control device according to claim 1 wherein said first and second indicator means are indicator lights.

3. A photoelectric exposure control device as claimed in claim 2, further including a translucent dispersing plate, both of said lights being disposed in close proximity under said plate, and a non-translucent wall portion separating said lights.

4. A photoelectric exposure control device as claimed in claim 3, wherein said wall portion extends to said plate.

5. A photoelectric exposure control device as claimed in claim 3, wherein said wall portion terminates short of said plate.

6. A photoelectric exposure control device as claimed in claim 3, wherein a non-transclucent masking plate extends over said dispersing plate and having an oppositely pointed arrow pattern cut-out therein substantially over said lights.

7. The photoelectric control device as claimed in claim 1 further comprising preamplifier means connected between said voltage divider and said first amplifier means.

8. The photoelectric control device as claimed in claim 1 wherein said transistors are of opposite type of conductivity.

9. A photoelectric exposure control device as claimed in claim 1, wherein said semi-conductor amplifiers are arranged in a differential connection.

References Cited

UNITED STATES PATENTS

| | | |
|---|---|---|
| Re. 21,210 | 9/1939 | Riszdorfer. |
| 2,661,650 | 12/1953 | Duntley. |
| 2,915,938 | 12/1959 | Hughes. |
| 3,323,430 | 6/1967 | Cooper. |
| 3,397,629 | 8/1968 | Mori et al. |

FOREIGN PATENTS 997,047    6/1965    Great Britain.

RONALD L. WIBERT, *Primary Examiner.*

W. A. SKLAR, *Assistant Examiner.*

U.S. Cl. X.R.

95—10; 356—224, 225, 227